United States Patent [19]

Baker

[11] Patent Number: 5,785,739

[45] Date of Patent: Jul. 28, 1998

[54] STEAM CRACKER GAS SEPARATION PROCESS

[75] Inventor: Richard W. Baker, Palo Alto, Calif.

[73] Assignee: Membrane Technology and Research, Inc., Menlo Park, Calif.

[21] Appl. No.: 789,376

[22] Filed: Jan. 24, 1997

[51] Int. Cl.$^6$ .................................... B01D 53/22
[52] U.S. Cl. ................ 95/39; 95/45; 95/50; 95/266
[58] Field of Search ................ 95/39, 45, 47–55, 95/243, 247, 258, 259, 266; 585/818

[56] References Cited

U.S. PATENT DOCUMENTS

| | | | |
|---|---|---|---|
| 2,214,368 | 9/1940 | Greensfelder et al. | 95/39 |
| 4,444,571 | 4/1984 | Matson | 95/50 X |
| 4,466,202 | 8/1984 | Merten | 95/50 X |
| 4,548,619 | 10/1985 | Steacy | 55/16 |
| 4,553,983 | 11/1985 | Baker | 55/16 |
| 4,654,063 | 3/1987 | Auvil et al. | 95/55 X |
| 4,732,583 | 3/1988 | DeLong et al. | 95/55 |
| 4,743,282 | 5/1988 | Mehra | 62/17 |
| 4,772,295 | 9/1988 | Kato et al. | 95/50 |
| 4,857,078 | 8/1989 | Watler | 55/16 |
| 4,885,063 | 12/1989 | Andre | 203/73 |
| 4,892,564 | 1/1990 | Cooley | 95/55 |
| 4,906,256 | 3/1990 | Baker et al. | 55/16 |
| 4,963,165 | 10/1990 | Blume et al. | 55/16 |
| 4,994,094 | 2/1991 | Behling et al. | 55/16 |
| 5,000,006 | 3/1991 | Itoh et al. | 95/39 X |
| 5,032,148 | 7/1991 | Baker et al. | 55/16 |
| 5,053,067 | 10/1991 | Chretien | 95/55 X |
| 5,069,686 | 12/1991 | Baker et al. | 55/16 |
| 5,082,481 | 1/1992 | Barchas et al. | 95/55 X |
| 5,082,551 | 1/1992 | Reynolds et al. | 208/100 |
| 5,086,623 | 2/1992 | Gauthier | 95/55 X |
| 5,089,033 | 2/1992 | Wijmans | 55/16 |
| 5,127,926 | 7/1992 | Baker et al. | 55/16 |
| 5,157,200 | 10/1992 | Mikkinen et al. | 95/55 X |
| 5,199,962 | 4/1993 | Wijmans | 55/16 |
| 5,205,843 | 4/1993 | Kaschemekat et al. | 55/16 |
| 5,256,295 | 10/1993 | Baker et al. | 214/640 |
| 5,281,255 | 1/1994 | Toy et al. | 95/50 |
| 5,374,300 | 12/1994 | Kaschemekat et al. | 95/39 |
| 5,414,190 | 5/1995 | Förg et al. | 95/50 X |
| 5,452,581 | 9/1995 | Dinh et al. | 62/24 |
| 5,501,722 | 3/1996 | Toy et al. | 95/59 |
| 5,634,354 | 6/1997 | Howard et al. | 62/624 |
| 5,647,227 | 7/1997 | Lokhandwala | 95/50 X |
| 5,669,958 | 9/1997 | Baker et al. | 95/39 X |
| 5,670,051 | 9/1997 | Pinnau et al. | 95/45 X |

Primary Examiner—Robert Spitzer
Attorney, Agent, or Firm—J. Farrant

[57] ABSTRACT

The invention is a process for treating a gas stream from ethylene or propylene production, or any other stream containing low molecular weight olefin gases and other hydrocarbons, to separate hydrogen and methane from the $C_{2+}$ hydrocarbons. The invention involves three separation steps: condensation, flash evaporation and membrane separation. The steps are integrated together in such a way as to provide a good separation between the components, and to avoid creation of secondary streams that need additional treatment.

16 Claims, 4 Drawing Sheets

STEAM CRACKER GAS SEPARATION PROCESS

FIELD OF THE INVENTION

The invention concerns the manufacture and separation of low molecular weight olefins, such as ethylene and propylene. More specifically, the invention concerns the separation of $C_{2+}$ hydrocarbons from hydrogen and methane as part of the olefin manufacturing process.

BACKGROUND OF THE INVENTION

Ethylene and propylene are important feedstocks used in the production of numerous petrochemical intermediate products and end products. They are made by cracking ethane, propane, or sometimes heavier paraffins or naphthas with steam at high temperature. Cracking plants are typically extremely large, with production capacities of $1 \times 10^9$ kg/year or more. The material to be processed (cracked) is diluted with an inert gas (usually steam) and heated to 900°–1,000° C. for a very short time (30–100 milliseconds). The gas mixture leaving the cracker is typically a mixture of hydrogen, methane, hydrocarbons and carbon dioxide, of which 10–40% of the gas may be ethylene produced by reactions such as $$C_2H_6 \rightarrow C_2H_4 + H_2$$

and $$C_3H_8 \rightarrow C_2H_4 + CH_4$$

After the carbon dioxide has been removed, the hydrogen and methane must be separated from the other gases.

The conventional method involves compressing the gas mixture to 500 psig and cooling to below –100° C. This separates the $C_{2+}$ components from the hydrogen. Some methane remains in the gas phase with the hydrogen and some is dissolved in the liquid hydrocarbon, which is subsequently sent to a demethanizer for removal of the remaining methane, followed by a series of distillation operations that produce the various fractionated hydrocarbon streams. As with all cryogenic separations, the removal of the hydrogen and methane is complicated and costly.

Although crackers are the main source of low molecular-weight olefins, similar streams containing hydrogen, some methane, and potentially useful amounts of ethylene and propylene are produced in a number of refinery operations. A typical source of such gas streams is fluid catalytic cracking (FCC). Since the primary goal of the refinery is not olefin production, it is usually not cost-effective or convenient to separate the olefins, which remain in a stream that is often simply burnt as fuel.

Separation of certain gas mixtures by means of selective membranes has been known to be possible for many years, and membrane-based gas separation systems are emerging to challenge conventional separations technology in a number of areas. That membranes have the potential to separate organic vapors from other gases is also known. For example, U.S. Pat. Nos. 4,553,983; 4,857,078; 4,963,165; 4,906,256; 4,994,094; 5,032,148; 5,069,686; 5,127,926; 5,281,255 and 5,501,722 all describe membranes, systems or processes suitable for such separations. Likewise, it has been recognized that condensation and membrane separation may be combined, as is shown in U.S. Pat. Nos. 5,089,033; 5,199,962; 5,205,843 and 5,374,300.

SUMMARY OF THE INVENTION

The invention is a process for treating a gas stream from ethylene or propylene production, or any other stream containing such low molecular weight olefin gases, to separate hydrogen and methane from the $C_{2+}$ hydrocarbons. The invention involves three separation steps: condensation, flash evaporation and membrane separation.

In a basic embodiment, the process of the invention includes the following steps:

(a) compressing and cooling the gas stream, resulting in partial condensation of the stream, thereby dividing the stream into a condensed portion enriched in $C_{2+}$ hydrocarbons and an uncondensed portion enriched in hydrogen and methane;

(b) flashing the condensed portion to at least partially remove additional amounts of hydrogen and methane as a gaseous flash stream, thereby creating a more-enriched $C_{2+}$ hydrocarbon product stream;

(c) treating the uncondensed portion in a membrane separation unit, to create a more hydrogen and methane enriched gas stream and a mixed stream; and optionally and most preferably;

(d) optionally recirculating the flash stream and the mixed stream from the membrane to the condensation step.

To applicants' knowledge, such an integrated combination of steps has not previously been used for this type of separation.

The condensation step is most preferably carried out at a pressure no greater than about 500 psig and a temperature no lower than about –40° C.

The flash evaporation step is preferably carried out by lowering the pressure of the condensate stream, such as through an expansion valve.

The membrane separation step is preferably carried out using a membrane that is selective for the $C_{2+}$ hydrocarbons over hydrogen and methane.

All of the unit separation operations may be performed as single-stage operations, or may be themselves carried out in multiple sub-steps.

When operated in the most preferred mode, with both the flashed gas stream and the mixed stream from the membrane being recirculated to the condensation step, no secondary streams requiring external treatment or disposal are produced. In this case, the process produces only two streams: a purified $C_{2+}$ hydrocarbon stream, which may be subjected to distillation or other treatment to separate the olefins and other hydrocarbons from one another, and a hydrogen/methane stream, which may be used as a fuel or as a hydrogen source.

Our process has several additional advantages. Since it can remove most of the hydrogen and methane from the $C_{2+}$ hydrocarbon product stream, the subsequent hydrocarbon distillation can often be accomplished without a demethanizer, or at least with a much smaller demethanizer than was previously necessary. In plants of the huge capacity of most steam crackers, this can represent a valuable savings in cost and complexity. Furthermore, our invention enables ethylene-containing gas mixtures, such as refinery gases, to be processed efficiently, so that the valuable olefin can be extracted as an additional product, a procedure that was seldom practical previously.

The membrane separation step can produce streams that are significantly colder, such as 10° C., 20° C. or more colder than the membrane feed stream. These streams can be used to provide cooling for the condensation step. In another aspect, therefore, the invention includes heat integration steps that can, in favorable cases, provide all or most of the cooling capacity required for condensation.

DETAILED DESCRIPTION OF THE INVENTION

The term gas as used herein means a gas or a vapor.

The term $C_{2+}$ hydrocarbon means a hydrocarbon having at least two carbon atoms; the term $C_{3+}$ hydrocarbon means a hydrocarbon having at least three carbon atoms; and so on.

The term olefin as used herein means a member of the family of unsaturated hydrocarbons having a carbon-carbon double bond of the series $C_nH_{2n}$, including members in which at least one halogen atom has been substituted for one of the hydrogen atoms.

Percentages herein are by volume unless otherwise stated.

In its first aspect, the invention is a process for treating a gas stream from an olefin manufacturing operation, particularly from ethylene and propylene manufacturing. As mentioned above, low molecular weight olefins of this type are typically made by cracking ethane or propane with steam. The gas mixture leaving the cracker is a mixture of hydrogen, methane, hydrocarbons and carbon dioxide. The process of the invention can be used after the carbon dioxide has been removed, for example by absorption into an amine solution, and before the hydrocarbons are fractionated from one another.

The process of the invention can also be applied to other streams that are sources of olefins, such as refinery streams.

The principal goal of the process is to separate the hydrogen and methane from the other hydrocarbon stream components.

The invention involves three separation steps: condensation, flash evaporation and membrane separation. The process is shown in a typical basic embodiment in FIG. 1. Turning now to this figure, feed stream, 1, is a gas stream from the cracking operation. It is assumed that this gas has already been subjected to treatment to remove carbon dioxide and water vapor. The stream, having been combined with recirculated streams, 7 and 9, to form inlet stream, 2, passes first through compressor, 10, to form compressed stream, 3, which then passes through heat exchanger or chiller, 11. The combination of compression and cooling results in the formation of a condensed stream, 5, containing the $C_{2+}$ hydrocarbons, but also containing some dissolved or condensed hydrogen and methane, and an uncondensed stream, 4, still containing some $C_{2+}$ hydrocarbons.

Figure 1:
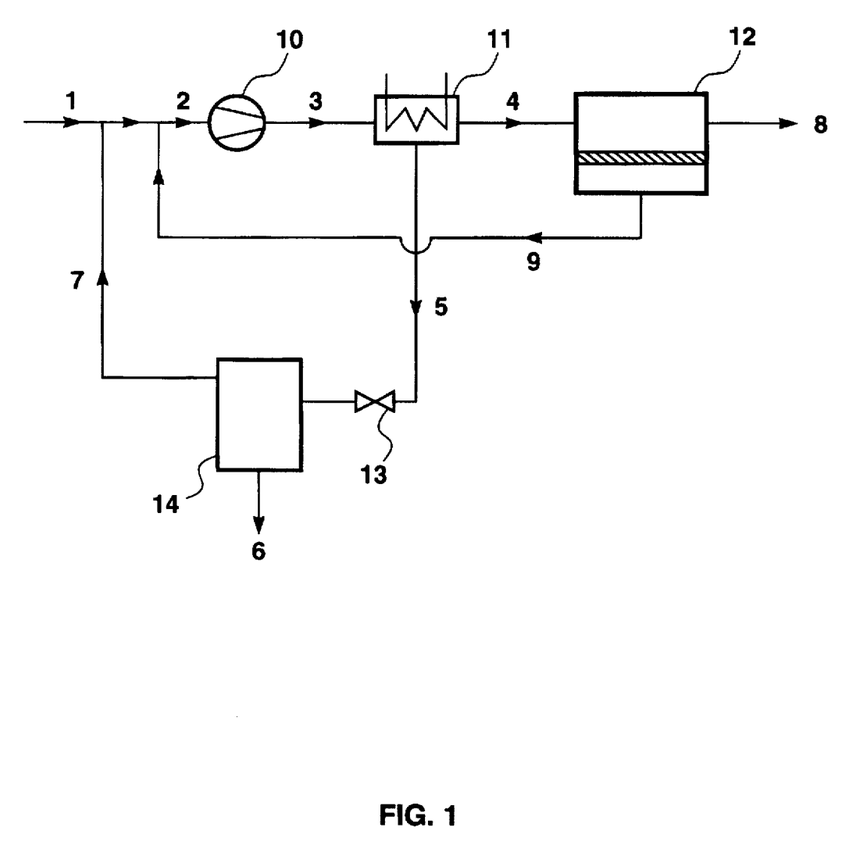
FIG. 1 is a schematic drawing showing a basic embodiment of the process.

The condensed stream or condensate, 5, then passes through expansion valve, 13, and into flash tank, 14. A portion of the condensate rapidly vaporizes, resulting in a volume of gas containing the hydrogen and methane, plus some $C_{2+}$ hydrocarbons. This flashed gas, 7, is generally passed back to the inlet side of the compressor for reprocessing. The fraction that does not evaporate during flashing is withdrawn as $C_{2+}$ hydrocarbons stream, 6. This liquid stream is then sent to a series of distillation operations to produce ethylene, propylene, and the other hydrocarbons as separate product streams.

The uncondensed stream, 4, is fed to a membrane separation unit, 12. The membrane unit contains a membrane that is selective for the $C_{2+}$ hydrocarbons over hydrogen and methane. Typically, a pressure difference between the feed and permeate sides of the membrane large enough to provide sufficient driving force for transmembrane permeation is provided by the upstream compressor, 10. To provide additional driving force, if desired, a vacuum pump could be connected on the permeate side of the membrane, so that permeate stream 9 is under partial vacuum. Alternatively, stream 4 could be subjected to additional compression. The membrane unit produces two streams, a residue stream, 8, and a permeate stream, 9. The residue stream, 8, is the hydrogen and methane stream. The hydrogen/methane stream can optionally be used as a fuel source within the process. It is often possible, however, and is more advantageous, to subject this stream to a further separation step to recover the hydrogen as an additional product. This separation can be done by using a hydrogen-selective membrane, such as those available under the trade name Permea®, or by pressure-swing adsorption, for example.

The permeate stream, 9, which is enriched in $C_{2+}$ hydrocarbon content compared with membrane feed stream, 4, is usually returned to the inlet side of the compressor for further processing.

Each of the steps is now discussed in more detail.

The goal of the condensation step is to bring the inlet gas stream to a pressure/temperature condition beyond the dewpoint of the $C_{2+}$ hydrocarbons, so that at least a portion of the hydrocarbons condense out of the gas stream in liquid form. The amount of hydrocarbons that can be removed from the gas stream in this way will depend on the boiling points, the concentration in the feed, and the operating conditions under which the condensation is performed.

The condensation step usually involves chilling and compression. Compressing the gas raises the dewpoint temperature, so a combination of compression and chilling is generally preferred. Occasionally, however, the steam cracking operation, or other upstream treatments, may be such that stream 1 is already at high pressure, such as above 100 or 200 psig for example. In this case, chilling alone may suffice to induce condensation.

It is desirable to avoid very high pressures and very low temperatures, since reaching these conditions adds to the cost and complexity of the process. By very high pressures, we mean pressures in excess of about 1,000 psig, or about 60 atm. The pressure at which the condensation step is operated should preferably be in the range below about 1,000 psig, more preferably below about 500 psig, and most preferably below about 250 psig.

By very low temperatures, we mean temperatures below $-100°$ C. The temperature at which the condensation step is operated should preferably be above about $-100°$ C., and most preferably above about $-40°$ C. Temperatures down to about the bottom of this most preferred range should be possible to reach by single-stage refrigeration, for example using propane as the cooling refrigerant. These temperatures are often much higher than could be used for recovery by compression/condensation alone.

The fraction of the $C_{2+}$ hydrocarbons remaining in the condenser vent gas after the condensation step depends on the vapor/liquid equilibrium at the operating conditions under which the condensation step is performed. Since the boiling point of ethylene at 1 atm pressure is about $-104°$ C., staying within the confines of the preferred ranges stated above would be difficult, or impossible, if good separation of ethylene, for example, were to be accomplished by condensation alone. However, since the process of the invention does not rely on condensation alone, high levels of separation of even the $C_2$ hydrocarbons can be achieved under the above-defined modest temperature and pressure conditions. For example, suppose the condensation step removes only 50% of the hydrocarbon content of the feed gas. If the condensation step is followed by a membrane separation step that can remove 80% of the hydrocarbon reaching it, then the total removal obtained is 90%. If the condensation step removes 80%, and is followed by a membrane separation step that also removes 80%, then the total removal is 96%. If the condensation step removes 80% and the membrane separation step 90%, the total removal is 98%.

In the practice of the invention, therefore, it is preferable only that the condensation step be designed to remove at least about 50% of the olefin monomer present in the feed to the condenser, more preferably, at least about 70%. Operation under extreme conditions to achieve 90% or more removal during condensation is unnecessary, because the process does not rely on condensation alone to achieve the overall separation.

The goal of the process is to separate the gas mixture into only two product streams: the hydrogen/methane gas stream exiting after the membrane separation step and the hydrocarbon stream exiting as the bottom stream from the flash evaporation step. Typically, there will be composition targets for each stream. A loss of more than 2 mol % of the total olefin content of the feed gas into the hydrogen/methane stream, stream 8 in FIG. 1, is usually unacceptable to plant operators, and a target of no more than 1 mol % loss will frequently be required. The target composition for the liquid hydrocarbon stream, stream 6 in FIG. 1, is more flexible, because any methane and hydrogen remaining in the stream can be separated by subsequent distillation. However, in many or most cases, it is possible to configure our process to remove essentially all of the hydrogen and to reduce the methane content to low levels, such as below about 10 mol %, more preferably below about 5 mol % and most preferably below about 3 mol %. This enables the large demethanizer column used in previous hydrocarbon trains to be substantially reduced in size or even eliminated completely. This is a significant advantage of our process.

The conditions under which the condensation step is carried out influence the compositions of both the condensed and uncondensed portions. If the condensation conditions are sufficiently extreme as to be beyond the methane dewpoint of the gas stream, then methane will start to condense. Even if the conditions do not reach the methane dewpoint, as will almost always be the case, methane and hydrogen will dissolve in the liquefied hydrocarbons. The higher the pressure and the lower the temperature at which the condensation is performed, the greater are the amounts of methane and hydrogen that will be carried down into the liquid condensate. For these reasons also, it is preferable to avoid extremes of pressure and temperature in the condensation step, since these will promote a less-enriched condensate.

If the gas stream contains water vapor, it is often convenient to use two chillers in series. The first chiller can be maintained at a temperature close to 0° C., and removes most of the entrained water. The second chiller is maintained at the lower temperature necessary to remove a substantial fraction of the higher-boiling component. Some water vapor will inevitably pass into the second chiller but the use of the first chiller will significantly reduce the need for defrosting the second. Alternatively, the condensation step may include another type of dehydration process through which the gas stream passes before it enters the condenser.

For simplicity, the condenser or chiller in FIG. 1 is identified by a single box, 11, from which the condensate liquid and remaining gas are shown emerging as discrete streams. It will be appreciated that, in practice, the condenser will often comprise a chiller, which produces a gas/liquid mixture, and a phase separator, in which the phases are separated and from which they are withdrawn as discrete streams. The same comment applies to FIGS. 2, 3 and 4.

Turning now to the flash evaporation step, this may be carried out by any appropriate technique. Typically, flashing is achieved by letting down the pressure of the liquid to be flashed, thereby achieving essentially instantaneous conversion of a portion of the liquid to the gas phase. This may be done by passing the liquid through an expansion valve into a receiving tank or chamber, or any other type of phase separation vessel, for example. The released gas can be drawn off from the upper part of the chamber; the remaining liquid can be withdrawn from the bottom. We prefer to carry out the flash evaporation by pressure release alone, since this is simple and convenient. We believe, also, that in general better removal of the lower-boiling gases is usually obtainable per unit pressure change than per unit temperature change, as shown in the examples below.

Alternatively, flash evaporation can be achieved by sending the liquid to a vessel and raising the temperature, while maintaining the pressure at its previous value, or by a combination of pressure lowering and heating. Those of skill in the art will appreciate that the decision as to which method to use in any specific set of circumstances should be determined taking into account the environment in which the process is to be carried out, and the relative importance of product purity, operating costs and other factors.

During the flash step, it is preferred to bring the condensate to a condition a little above the saturation vapor pressure of the $C_2$ hydrocarbons at that temperature. This controls loss of $C_{2+}$ hydrocarbons into the gas phase. By a little above the saturation vapor pressure, we mean most preferably about 0–50 psig above the saturation vapor pressure at the flashing temperature.

The amounts and compositions of the flashed gas and the product liquid depend on the changes of pressure and temperature to which the condensate is subjected. Generally, the results are very close to a theoretical one-stage evaporation step and can be calculated to good reliability from tabulated thermodynamic data. The energy taken to evaporate the flash gas results in a significant lowering of the temperature of the remaining liquid, such as 10° C., 20° C. or more. If desired, this liquid may be used to cool the incoming stream, such as by running against the incoming stream in heat exchanger or chiller, 11. However, this will necessitate lowering the pressure of the stream, which is usually required at high pressure for subsequent fractionation operations, so is not preferred.

Optionally, flashing may be carried out in two or more stages, such as by lowering the pressure incrementally. This type of operation produces several gas streams at different pressures. By removing at least a portion of the gas at high pressure, the cost of compression of the remainder is reduced. As another alternative, it is possible to carry out the flashing step in a very small distillation column, able to perform a two- to ten-theoretical-stage distillation, instead of a simple flash tank. Though this adds to the cost and complexity of the flashing step, it can provide high levels of methane removal, and still represents a vast improvement over the prior art use of a full-scale cryogenic demethanizer, which may require several hundred theoretical stages.

Figure 2:
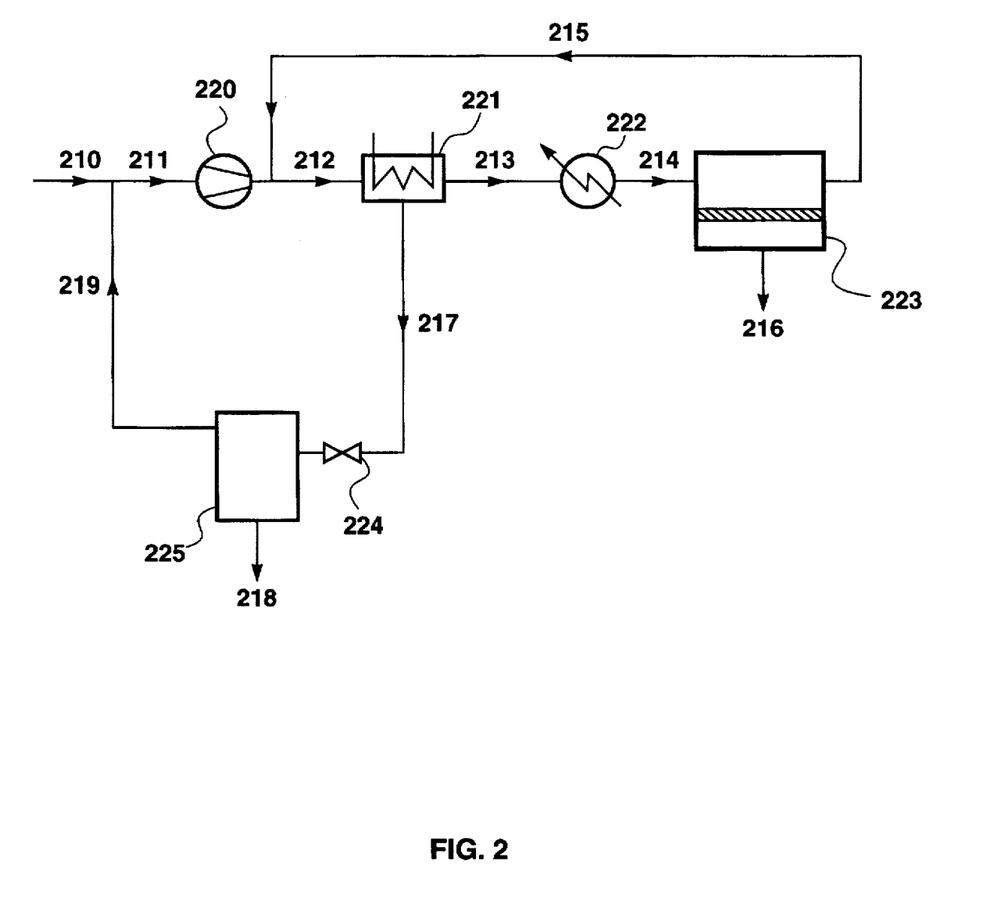
FIG. 2 is a schematic drawing showing an embodiment of the process that uses a membrane selective for hydrogen and methane over $C_{2+}$ hydrocarbons.

The gas phase liberated during the flash evaporation step is shown in FIGS. 1 and 2 as being returned to the condensation step. This is a preferred operating mode for the process, because it eliminates a stream that may represent a secondary source of pollution or lost resources. However, depending on the specifics of plant operation, it may optionally be sent elsewhere, pooled with other waste streams, flared or the like, and such embodiments are within the scope of the invention.

The third unit separation process is membrane separation. The membrane unit contains a membrane that exhibits a substantially different permeability for the $C_{2+}$ hydrocarbons than for the methane and hydrogen. It may be relatively permeable to the $C_{2+}$ hydrocarbons but relatively impermeable to hydrogen and methane, or relatively permeable to hydrogen and methane but relatively impermeable to the $C_{2+}$ hydrocarbons.

The permeability of a gas or vapor through a membrane is a product of the diffusion coefficient, D, and the Henry's law sorption coefficient, k. D is a measure of the permeant's mobility in the polymer; k is a measure of the permeant's sorption into the polymer. The diffusion coefficient tends to decrease as the molecular size of the permeant increases, because large molecules interact with more segments of the polymer chains and are thus less mobile. The sorption coefficient depends, amongst other factors, on the condensability of the gas.

Depending on the nature of the polymer, either the diffusion or the sorption component of the permeability may dominate. In rigid, glassy polymer materials, the diffusion coefficient tends to be the controlling factor and the ability of molecules to permeate is very size dependent. As a result, glassy membranes tend to permeate small, low-boiling molecules, such as hydrogen and methane, faster than larger, more condensable molecules, such as $C_{2+}$ organic molecules. For rubbery or elastomeric polymers, the difference in size is much less critical, because the polymer chains can be flexed, and sorption effects generally dominate the permeability. Elastomeric materials, therefore, tend to permeate large, condensable molecules faster than small, low-boiling molecules. A second factor in the choice is that elastomeric membranes generally provide much higher transmembrane fluxes than glassy membranes.

Generally, we prefer to use a high-flux elastomeric membrane, selective for the hydrocarbons, unless the relative proportions of hydrogen, methane and $C_{2+}$ hydrocarbons are so unbalanced that using a hydrocarbon-selective membrane would necessitate permeating almost all of the feed stream.

Examples of polymers that can be used to make elastomeric membranes, include, but are not limited to, nitrile rubber, neoprene, polydimethylsiloxane (silicone rubber), chlorosulfonated polyethylene, polysilicone-carbonate copolymers, fluoroelastomers, plasticized polyvinylchloride, polyurethane, cis-polybutadiene, cis-polyisoprene, poly(butene-1), polystyrene-butadiene copolymers, styrene/butadiene/styrene block copolymers, styrene/ethylene/butylene block copolymers, thermoplastic polyolefin elastomers, and block copolymers of polyethers, polyamides and polyesters.

Examples of polymers that can be used to make glassy membranes include, polysulfones, polyimides, polyamides, polyaramides, polyphenylene oxide, polycarbonates, ethylcellulose or cellulose acetate.

An exception to the general guidelines above is the use of super-glassy polymer membranes. Super-glassy polymers have a rigid structure, high glass transition temperatures, typically above 100° C., 200° C. or higher, and would normally be expected to be selective for smaller, less condensable molecules over larger, more condensable molecules. However, membranes made from certain of these polymers that have unusually high free volume within the polymer material have been found to exhibit anomalous behavior, in that they preferentially permeate larger, more condensable molecules over smaller, less condensable molecules. The best known super-glassy polymer identified to date is poly(trimethylsilylpropyne)[PTMSP], the use of which to preferentially separate condensable components from lower-boiling, less condensable components is described in U.S. Pat. No. 5,281,255, for example. This type of membrane would be useful in the present invention as a hydrocarbon-selective membrane. More detailed discussion of the choice of membrane for this type of separation may be found in co-owned and copending Ser. No. 08/780,868, entitled "Separation Process Combining Condensation, Membrane Separation and Flash Evaporation", which is incorporated herein by reference in its entirety.

The membrane may take the form of a homogeneous film, an integral asymmetric membrane, a multilayer composite membrane, a membrane incorporating a gel or liquid layer or particulates, or any other form known in the art. If elastomeric membranes are used, the preferred form is a composite membrane including a microporous support layer for mechanical strength and a rubbery coating layer that is responsible for the separation properties. If glassy membranes are used, an integral asymmetric membrane is the preferred form.

The membranes may be manufactured as flat sheets or as fibers and housed in any convenient module form, including spiral-wound modules, plate-and-frame modules and potted hollow-fiber modules. The making of all these types of membranes and modules is well known in the art. Flat-sheet membranes in spiral-wound modules are our most preferred choice.

Whatever their composition and structure, the membranes should most preferably have a selectivity for the faster permeating components over the other components of at least about 3. Since most streams to be treated are multicomponent mixtures of faster and slower permeating components, this preferred selectivity refers to the ratio of the average of the permeability of the faster-permeating, $C_{2+}$ components and the permeability of the slower-permeating, non-$C_{2+}$ components. The membrane should also preferably provide an average pressure-normalized flux of the faster-permeating components of at least about $1 \times 10^6$ cm$^3$(STP)/cm$^2$.s.cmHg, more preferably at least about $1 \times 10^{-5}$ cm$^3$ (STP)/cm$^2$.s.cmHg.

As was stated above, usually no driving force beyond the compressor in the feed line is needed to run the membrane unit. If the raw gas stream is already at high pressure, such as 150 psig or above, before it enters the process however, it was already pointed out that the compressor in the feed line might be dispensed with and the condensation step carried out by cooling alone, without additional compression. In this case, the permeate stream, 9 in FIG. 1, will have to be recompressed before mixing with the incoming feed stream upstream of the chiller or condenser.

A single-stage membrane separation operation using a membrane with a good selectivity can typically remove up to about 80 or 90% of the preferentially permeating component from the feed stream and produce a permeate stream that has five times or more the concentration of that component of the feed gas. This degree of separation is adequate for many applications. If the residue stream requires further purification, it may be passed to a second bank of modules for a second processing step. If the permeate stream requires further concentration, it may be passed to a second bank of modules for a second-stage treatment. Such multistage or multistep processes, and variants thereof, will be familiar to those of skill in the art, who will appreciate that the membrane separation step may be configured in many possible ways, including single-stage, multistage, multistep, or more complicated arrays of two or more units in series or cascade arrangements. Such arrangements are referred to in more detail in co-owned and copending Ser. No. 08/789,377, entitled "Monomer Recovery Process", and in U.S. Pat. No. 5,256,295, both of which are incorporated herein by reference in their entirety.

FIG. 2 shows an embodiment of the invention in which a glassy membrane selective to hydrogen and methane over the $C_{2+}$ hydrocarbons is used. Referring now to that figure, stream, 210, is the gas stream from the cracking operation. Inlet stream, 211, is compressed in compressor, 220, and compressed stream 212, which includes recirculated stream, 215, is cooled in chiller or condenser, 221. The combination of compression and cooling results in the formation of a condensed stream, 217, containing the $C_{2+}$ hydrocarbons, but also containing some dissolved or condensed hydrogen and methane, and an uncondensed stream, 213, still containing some $C_{2+}$ hydrocarbons. Since this uncondensed stream is saturated with hydrocarbons, and will be further enriched in hydrocarbons on the high-pressure side of the membrane unit, 223, it is preferred to heat the stream to avoid condensation of hydrocarbons within the membrane modules. To this end, heater, 222, is positioned between the condenser and the membrane unit. Heated stream, 214, passes to the membrane unit, where it is treated to yield hydrocarbon-enriched residue stream, 215, which is recirculated upstream of the condenser. Permeate stream, 216, is the hydrogen/methane product stream. Condensate stream, 217, is subjected to flash evaporation by reducing the pressure by means of expansion valve, 224. The resulting flashed gas stream, 219, is recirculated upstream of compressor, 220. The liquid $C_{2+}$ hydrocarbons product stream, 218, is withdrawn from the flash tank, 225.

When the membrane separation step uses a membrane that is organic-selective, that is, is selective for the olefin and $C_{2+}$ hydrocarbon components over the hydrogen and methane, the residue and permeate streams from the membrane unit may be significantly colder than the membrane feed stream. This phenomenon, which is believed to arise because of Joule-Thomson cooling as the organic vapor expands across the membrane to the permeate side, is likely to occur if the membrane has a reasonably good selectivity for the $C_{2+}$ hydrocarbons over hydrogen, such as about 10 or more, these components have a combined reasonably high concentration in the feed to the membrane unit, such as about 5%, 10% or more, and their removal from the membrane feed into the permeate is reasonably high, such as about 50%, 80%, 90% or more. The phenomenon is discussed in more detail in co-owned and copending Ser. No. 08/788,629, entitled "Membrane Expansion Process for Organic Component Recovery From Gases", which is incorporated herein by reference in its entirety.

Since the conditions mentioned above frequently obtain during treatment of cracker gases according to the teachings herein, the membrane residue and permeate streams may typically be 5° C., 10° C. or more colder than the feed to the membrane unit, and it may be both convenient and beneficial to use one or both cold streams from the membrane separation step to provide or supplement cooling for the condensation step.

Figure 4:
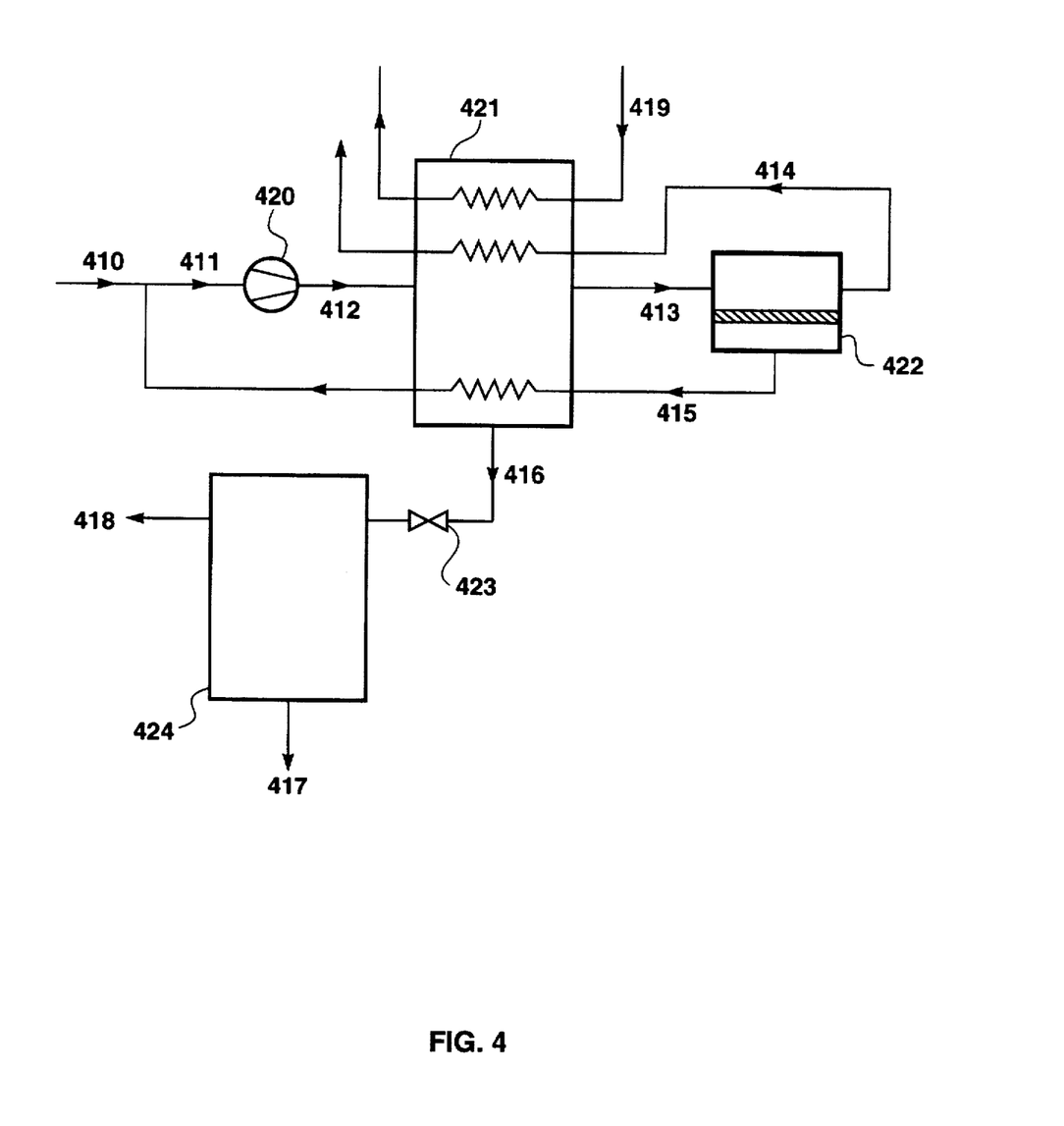
FIG. 4 is a schematic drawing showing an embodiment of the invention in which cooling for the condenser is provided by the membrane residue and permeate streams.

Such an arrangement is shown in FIG. 4. Turning to this figure, feed stream, 410, is the stream from the cracker, which is combined with recirculated membrane permeate stream, 415, to form inlet stream, 411. Stream 411 passes through compressor, 420, to form compressed stream, 412, which then passes through heat exchanger or chiller, 421. In the embodiment shown in this figure, the heat exchanger is cooled by membrane residue stream, 414, membrane permeate stream, 415, and external refrigeration stream, 419. Other arrangements, in which only the residue or the permeate stream are used for cooling, or in which sufficient cooling capacity is extracted from the membrane return streams that no external refrigeration stream 419 is needed are also possible and within the scope of the invention.

The combination of compression and cooling results in the formation of condensed stream, 416, which is passed through expansion valve, 423, and into flash tank, 424. The evolved gas phase, stream 418, can be discharged to any destination, or returned as in FIG. 1 to the inlet side of the compressor for reprocessing. The liquid hydrocarbon product is withdrawn as stream, 417.

The uncondensed stream, 413, is fed to membrane separation unit, 422. The membrane unit produces residue stream, 414, which is the purified, hydrogen and methane stream and permeate stream, 415, the hydrocarbon-enriched stream, which is returned via the heat exchanger to the compression step.

The invention is now illustrated in further detail by specific examples. These examples are intended to further clarify the invention, and are not intended to limit the scope in any way.

EXAMPLES

Example 1

A computer calculation was performed using ChemCad III software (Chemstations Inc., Houston, Tex.) to model the separation of hydrogen and methane from an ethylene-containing gas stream generated by steam cracking. The feed stream composition was assumed to be 45 mol % hydrogen and methane, 35 mol % ethylene, the balance other light hydrocarbons. It was assumed that the process shown in FIG. 1 was used, that raw stream, 1, is at 100 psia and that inlet stream, 2, is compressed to 500 psia in compressor, 10, and cooled to −40° C. in chiller, 11. Under these conditions, uncondensed stream, 4, still contains 33 mol % ethylene. The membrane unit was assumed to contain a membrane selective for the $C_{2+}$ hydrocarbons over methane and hydrogen, and having the following permeability properties, which are typical of a silicone rubber membrane, for example:

| Gas: | Hydrogen | Pressure normalized flux ($\times 10^{-6}$ cm$^3$(STP)/ cm$^2 \cdot$s$\cdot$cmHg | 200 |
|---|---|---|---|
| | Methane | | 240 |
| | Ethane | | 600 |
| | Ethylene | | 720 |
| | Propane | | 960 |
| | Propylene | | 1,200 |
| | Butane | | 1,920 |

After treatment in the membrane unit, the residue stream, 8, contains 98.8 mol % methane and hydrogen and 1 mol % ethylene. Condensate stream, 5, was assumed to be subjected to flash evaporation by reducing the pressure to 20 psia. The liquid product stream, 6, contains less than 0.01 mol % hydrogen and 1.8 mol % methane.

The results of the calculation are shown in full in Table 1. Stream numbers correspond to FIG. 1.

TABLE 1

| Stream | 1 | 2 | 4 | 8 | 9 | 5 | 6 | 7 |
|---|---|---|---|---|---|---|---|---|
| Volume (scfm) | 1,000 | 5,800 | 4,837 | 444 | 4,394 | 963 | 553 | 410 |
| Temp. (°C.) | 25 | −53 | −40 | −70 | −70 | −40 | −99 | −99 |
| Pressure (psia) | 100 | 20 | 500 | 500 | 20 | 500 | 20 | 20 |
| Component (mol %): | | | | | | | | |
| Hydrogen | 20 | 19.8 | 23.5 | 45 | 21.3 | 1.2 | — | 2.8 |
| Methane | 25 | 35.5 | 39.4 | 53.8 | 38.0 | 15.7 | 1.8 | 34.5 |
| Ethane | 5 | 3.1 | 2.4 | 0.2 | 2.6 | 6.6 | 8.9 | 3.5 |
| Propane | 1 | 0.25 | 0.1 | — | 0.1 | 1.1 | 1.8 | 0.04 |
| Butane | 6 | 1.2 | 0.2 | — | 0.2 | 6.3 | 10.8 | 0.04 |
| Ethylene | 35 | 38.1 | 33.6 | 1.0 | 36.9 | 60.7 | 62.2 | 58.6 |
| Propylene | 8 | 2.1 | 0.8 | — | 0.95 | 8.5 | 14.5 | 0.5 |

— less than 0.01%

The load on the cracker gas compressor is increased compared with the conventional process that uses condensation alone by the ratio 5,800:1,000, because of the recirculation of streams 7 and 9. The theoretical horse power requirement of this compressor is 1,380 hp. However, the condensation step is performed at −40° C., rather than below −100° C. as in a conventional plant. Also, both of recirculation streams 7 and 9 are cold, so the refrigeration requirement is substantially less than in a conventional plant.

The membrane residue stream, 8, remains under pressure and could be subjected to additional membrane treatment, such as using Permea® membranes or the like, to separate the hydrogen from the methane.

Example 2

In Example 1, the condensation step was performed at −40° C. It might be assumed that carrying out this step at a lower temperature, such as −60° C., would be beneficial, since more ethylene is condensed immediately, thereby reducing the volume of the membrane permeate recycle stream, which lessens the load on the compressor. Therefore, we performed the same modeling calculation as in Example 1, but this time assuming the chiller cools the inlet stream to −60° C. The results are shown in Table 2.

TABLE 2

| Stream | 1 | 2 | 4 | 8 | 9 | 5 | 6 | 7 |
|---|---|---|---|---|---|---|---|---|
| Volume (scfm) | 1,000 | 3,247 | 2,338 | 435 | 1,904 | 909 | 566 | 342 |
| Temp. (°C.) | 25 | −47 | −60 | −81 | −70 | −60 | −107 | −107 |
| Pressure (psia) | 100 | 20 | 500 | 500 | 20 | 500 | 20 | 20 |
| Component (mol %): | | | | | | | | |
| Hydrogen | 20 | 23.9 | 32.7 | 46 | 29.7 | 1.3 | — | 3.5 |
| Methane | 25 | 41.8 | 48.7 | 52.8 | 47.7 | 24.1 | 3.7 | 57.7 |
| Ethane | 5 | 2.6 | 1.2 | 0.1 | 1.4 | 6.2 | 8.7 | 2.1 |
| Propane | 1 | 0.34 | 0.03 | — | 0.05 | 1.1 | 1.8 | 0.02 |
| Butane | 6 | 1.9 | 0.06 | — | 0.08 | 6.6 | 10.6 | 0.02 |
| Ethylene | 35 | 26.7 | 16.9 | 1.0 | 20.5 | 51.8 | 61.1 | 36.4 |
| Propylene | 8 | 2.8 | 0.4 | — | 0.47 | 8.9 | 14.1 | 0.2 |

— less than 0.01%

As can be seen, the purity of the liquid hydrocarbon stream is lower than in the previous example. Stream 6 contains 3.7 mol % methane, compared with only 1.8 mol % in Example 1. This is because the lower condensation temperature promotes dissolution of more methane in the condensing hydrocarbons during the condensation step. In this case, however, the compressor horsepower requirement is 800 hp, compared with 1,380 hp in Example 1.

Example 3

In Example 1, it was assumed that the flash evaporation step is carried out by lowering the pressure on the condensate stream to 20 psia. This produces a flashed vapor stream of about 410 scfm containing the bulk of the methane and essentially all of the hydrogen contained in the liquid condensate. This flash operation cools the liquid product and flash gas streams to −99.3° C. At these temperature and pressure conditions, about 1.8 mol % methane remains in the liquid product.

We ran a series of calculations to determine what effect raising the temperature of the flashing step slightly would have on the methane removal. This was done by assuming that liquid product stream, 6, is heated by a few degrees. Some additional methane is then driven off, but of course this further increases the compressor load, and the membrane area required. The results of the calculations are given in Table 3.

TABLE 3

| Temperature of stream 6 (°C.) | Volume of flashed gas (scfm) | Membrane area required (m²) | Theoretical hp of compressor (hp) | Methane in product stream 6 (mol %) |
|---|---|---|---|---|
| −99.3 | 410 | 269 | 1,380 | 1.8 |
| −98 | 550 | 283 | 1,470 | 1.5 |
| −97 | 710 | 292 | 1,540 | 1.3 |
| −96 | 1,050 | 308 | 1,670 | 1.1 |
| −95 | 2,050 | 333 | 1,970 | 0.9 |

In all cases, the residue stream from the membrane separation step has a composition as in Example 1, that is, it contains only 1 mol % ethylene. As can be seen, very high purity liquid product can be obtained, the limiting factor being the amounts of membrane area and compressor capacity that are acceptable to use to deal with the much greater volume of flash gas that must be recirculated.

Example 4

Figure 3:
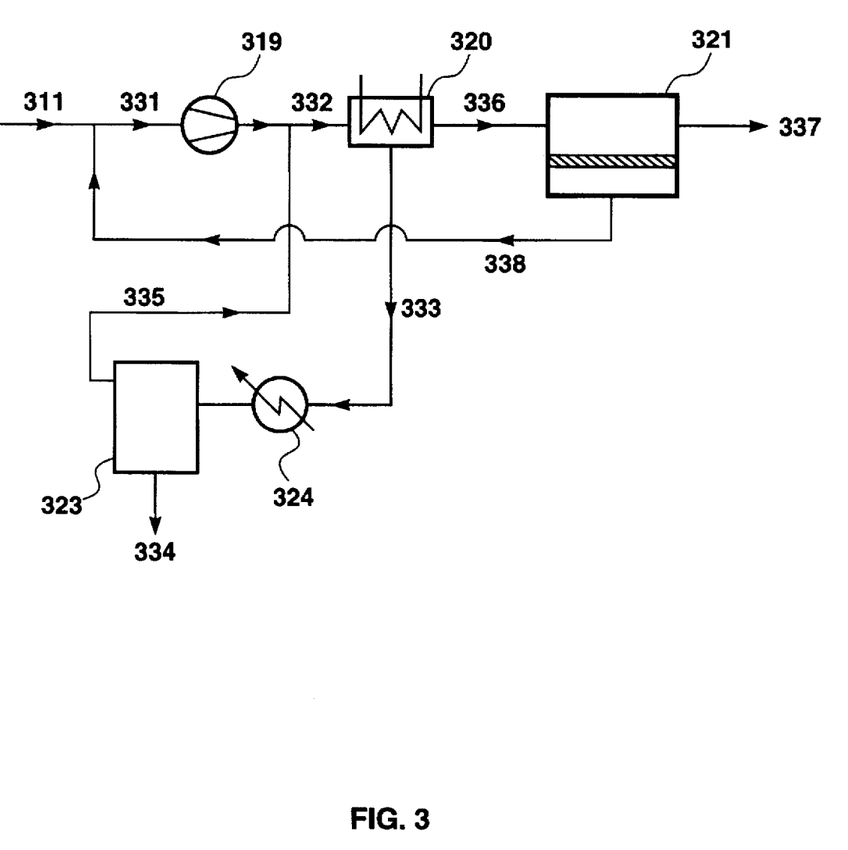
FIG. 3 is a schematic drawing showing an embodiment of the process in which the flash evaporation step is carried out by heating the condensate.

A computer calculation was performed using ChemCad software to model the separation of a feed stream having the same composition as in Example 1. In this case, the process was assumed to be as in FIG. 3. This process differs from the processes used in Examples 1 to 3, in that the flashing step is assumed to be carried out by heating alone, that is, without changing the pressure of the condensate stream. Referring now to FIG. 3, raw stream, 311, is again assumed to be at 100 psia. Inlet stream, 331, is compressed to 500 psia in compressor, 319. After mixing with return stream, 335, from the flash evaporation step to form stream, 332, the incoming gas is cooled to −40° C. in chiller, 320. Under these conditions, uncondensed stream, 336, still contains 31 mol % ethylene, and is passed to membrane unit, 321, which was assumed to contain a membrane with the same properties as in Example 1.

After treatment in the membrane unit, the residue stream, 337, contains 98.8 mol % methane and hydrogen and 1 mol % ethylene. Condensate stream, 333, is subjected to flash evaporation by heating to −10° C. in heater, 324. The liquid product stream, 334, is withdrawn from the flash tank, 323.

Flashed gas stream, 335, is recirculated to the condensation step. Since the gas remains under pressure, it need not be recompressed, but can join the feed line downstream of the compressor but upstream of the chiller, as shown in the figure. Membrane permeate stream, 338, which is at low pressure, is recirculated as in the earlier calculations upstream of the inlet compressor.

The results of the calculation are shown in full in Table 4. Stream numbers correspond to FIG. 3. As can be seen, this type of separation is less efficient than low-pressure flashing; the product liquid, stream 334, still contains 9.7 mol % methane. However, the compressor horsepower requirement, 1,100 hp, and membrane area, 215 m$^2$, are both modest.

C. in chiller, 221. The off-gas from the condenser was assumed to be heated from –40° C. to –20° C. in heater 222. The membrane was assumed to have the following permeability properties:

| Gas: | Hydrogen | Pressure normalized flux ($\times 10^{-6}$ cm$^3$(STP)/ cm$^2 \cdot$s$\cdot$cmHg) | 100 |
|---|---|---|---|
| | Methane | | 10 |
| | Ethane | | 5 |
| | Ethylene | | 4 |
| | Propane | | 2 |
| | Propylene | | 1 |
| | Butane | | 20 |

TABLE 4

| Stream | 311 | 331 | 332 | 338 | 335 | 333 | 336 | 337 | 334 |
|---|---|---|---|---|---|---|---|---|---|
| Volume (scfm) | 1,000 | 4,426 | 4,617 | 3,428 | 191 | 796 | 3,820 | 393 | 605 |
| Temp. (°C.) | 25 | –43 | 33 | –66 | –10 | –40 | –40 | –66 | –10 |
| Pressure (psia) | 100 | 20 | 500 | 20 | 500 | 500 | 500 | 500 | 500 |
| Component (mol %): | | | | | | | | | |
| Hydrogen | 20 | 24.1 | 23.3 | 25.3 | 4.5 | 1.3 | 27.9 | 50.4 | 0.3 |
| Methane | 25 | 33.5 | 33.3 | 35.9 | 29.4 | 14.5 | 37.2 | 48.4 | 9.7 |
| Ethane | 5 | 3.4 | 3.5 | 2.9 | 5.6 | 7.5 | 2.6 | 0.2 | 8.1 |
| Propane | 1 | 0.32 | 0.32 | 0.1 | 0.4 | 1.3 | 0.1 | — | 1.7 |
| Butane | 6 | 1.5 | 1.5 | 0.2 | 1.0 | 7.8 | 0.2 | — | 9.9 |
| Ethylene | 35 | 34.5 | 35.4 | 34.3 | 55.5 | 56.7 | 30.9 | 1.0 | 57.0 |
| Propylene | 8 | 2.7 | 2.7 | 1.2 | 3.6 | 10.9 | 1.0 | — | 13.2 |

— less than 0.01%

The calculations were repeated using flash temperatures of –5° C. and –20° C. At –5° C., the methane content of the product liquid is about 8 mol %; at –20° C. it is about 12 mol %. This would suggest that better results could be obtained at a higher flash temperature. However, above about 0° C. it is not possible to retain the purity of the membrane residue stream while keeping other conditions constant. At this point, the ethylene content of the stream rises above 1 mol %.

Example 5

A computer calculation was performed using ChemCad software to model the separation of a feed stream having the same attributes as in Example 1. In this case, the process was assumed to be as in FIG. 2, that is a glassy membrane selectively permeable to hydrogen and methane was assumed to be used. The stream was assumed to be compressed to 500 psia in compressor, 220, and chilled to –40°

The results of the calculation are shown in full in Table 5. Stream numbers correspond to FIG. 2.

TABLE 5

| Stream | 210 | 211 | 212 | 214 | 215 | 217 | 219 | 216 | 218 |
|---|---|---|---|---|---|---|---|---|---|
| Volume (scfm) | 1,000 | 1,233 | 1,860 | 1,080 | 626 | 780 | 233 | 453 | 547 |
| Temp. (°C.) | 25 | 9 | 68 | –20 | –20 | –40 | –72 | –20 | –72 |
| Pressure (psia) | 100 | 100 | 500 | 500 | 500 | 500 | 100 | 20 | 100 |
| Component (mol %): | | | | | | | | | |
| Hydrogen | 20 | 17.0 | 11.4 | 18.8 | 0.5 | 1.3 | 4.2 | 44.1 | 0.04 |
| Methane | 25 | 28.8 | 33.3 | 44.6 | 42.2 | 17.6 | 44.9 | 48.0 | 6.0 |
| Ethane | 5 | 4.6 | 4.0 | 2.3 | 2.9 | 6.4 | 2.9 | 1.5 | 7.9 |
| Propane | 1 | 0.1 | 0.6 | 0.1 | 0.1 | 1.3 | 0.1 | 0.1 | 1.8 |
| Butane | 6 | 4.9 | 3.4 | 0.3 | 0.4 | 7.7 | 0.1 | 0.1 | 11.0 |
| Ethylene | 35 | 37.3 | 42.7 | 32.9 | 53.3 | 56.2 | 47.1 | 4.8 | 60.0 |
| Propylene | 8 | 6.6 | 4.6 | 1.0 | 0.5 | 9.5 | 0.7 | 1.6 | 13.3 |

— less than 0.01%

The theoretical horse power requirement of the compressor was calculated to be 147 hp. This is small compared with the olefin-selective examples, because the residue gas can be recirculated with a blower, not shown in the figure, rather than passing back through the main compressor. However, the membrane area required to perform the separation was calculated to be 900 m², which is large compared with the rubbery membrane examples, because the glassy membranes are much less permeable.

After treatment in the membrane unit, the permeate stream, 216, still contains almost 5 mol % ethylene. This makes this type of embodiment less preferred, unless membranes with high methane/ethylene selectivity are available, or a relatively high loss of ethylene is acceptable.

Example 6

A computer calculation was performed using ChemCad software to demonstrate the benefits of using the membrane permeate and/or residue streams to provide cooling for the condensation step. A first calculation was performed without making use of the cooling capacity of the membrane streams, so that the process design was as FIG. 1. The flashing step was assumed to be performed in a small, three-tray distillation unit at 100 psia. Other assumptions were as in Example 1, so that the stream was assumed to be compressed to 500 psia, chilled to −40° C. and treated in a membrane unit containing a silicone rubber, or similar, membrane. The results of the calculations are given in Table 6.

TABLE 6

| Stream | 1 | 2 | 4 | 8 | 9 | 5 | 6 | 7 |
|---|---|---|---|---|---|---|---|---|
| Volume (scfm) | 1,000 | 14,788 | 13,896 | 449 | 13,447 | 892 | 547 | 345 |
| Temp. (°C.) | 25 | −59 | −40 | −67 | −67 | −40 | −56 | −75 |
| Pressure (psia) | 100 | 100 | 500 | 500 | 100 | 500 | 100 | 100 |
| Component (mol %): | | | | | | | | |
| Hydrogen | 20 | 20.1 | 21.4 | 44.4 | 20.6 | 1.4 | — | 3.7 |
| Methane | 25 | 39.3 | 40.8 | 54.3 | 40.3 | 16.1 | 0.90 | 40.1 |
| Ethane | 5 | 2.5 | 2.3 | 0.29 | 2.3 | 6.3 | 8.9 | 2.3 |
| Propane | 1 | 0.15 | 0.09 | — | 0.10 | 1.1 | 1.8 | 0.01 |
| Butane | 6 | 0.64 | 0.25 | — | 0.26 | 6.7 | 11.0 | 0.01 |
| Ethylene | 35 | 35.9 | 34.6 | 1.0 | 35.5 | 59.3 | 62.8 | 53.6 |
| Propylene | 8 | 1.4 | 0.9 | — | 0.95 | 9.0 | 14.6 | 0.10 |

— less than 0.01%

For simplicity, the calculation assumed that the membrane residue and permeate streams, 8 and 9, are at the same temperature. As can be seen, these streams are at −67° C., compared with −40° C. for the membrane feed stream 4. The heat duty of the condenser, 11 needed to cool the feed stream to −40° C. was calculated to be −3.56 MMBtu/h.

The calculations were repeated, this time passing residue and permeate streams 8 and 9 through a heat exchanger/condenser, as shown in FIG. 4, and supplementing with additional cooling to lower the condensation temperature to −40° C. The results of the heat balance calculations in this case were as follows:

Cooling provided by residue stream: 2.89 MMBtu/h
Cooling provided by permeate stream: 0.09
Total cooling provided by membrane streams: 2.98
Cooling provided by external refrigeration: 0.57 MMBtu/h
Total cooling provided: 3.56 MMBtu/h.

As can be seen by comparing the results, the cooling provided by heat integration of the membrane streams accounts for over 80% of the total cooling capacity required.

Example 7

A computer calculation was performed using ChemCad software to compare the performance of single-stage flashing with a very simple distillation. The stream composition was assumed to be as in Example 1. Also as in Example 1, the stream was assumed to be compressed to 500 psia, chilled to −40° C. and treated in a membrane unit containing a silicone rubber, or similar, membrane. However, in this calculation the flashing step was assumed to be carried out by reducing the pressure on the condensate to 100 psia, not 20 psia as in Example 1. The same calculation was then repeated, only replacing the flashing step by a three-tray distillation, then a ten-tray distillation, with the condensate stream being fed into the distillation unit at 100 psia. The results of the calculations are given in Table 7.

TABLE 7

| Treatment of condensate stream | Volume of flashed or overhead gas (scfm) | Membrane area required (m²) | Theoretical hp of compressor (hp) | Methane in product stream 6 (mol %) |
|---|---|---|---|---|
| Single-stage flash | 226 | 880 | 1,206 | 5.3 |
| Three-tray distillation | 345 | 1,000 | 1,365 | 0.8 |
| Ten-tray distillation | 322 | 994 | 1,353 | 0.01 |

As can be seen from the table, much less methane is retained in the product stream when even an extremely small distillation column is used. In any specific situation, the benefits of better removal must be weighed against the simplicity of a simple flashing step.

I claim:

1. A process for treating a gas stream comprising hydrogen, methane, an olefin and at least one other $C_{2+}$ hydrocarbon, to separate said olefin and said $C_{2+}$ hydrocarbon from hydrogen and methane, said process comprising the following steps:

(a) compressing said gas stream to a pressure no greater than about 1,000 psig;
    (b) cooling said gas stream to a temperature no lower than about −100° C.; said steps (a) and (b) resulting in partial condensation of said gas stream, thereby dividing said gas stream into a condensed portion enriched in said olefin and said $C_{2+}$ hydrocarbon and an uncondensed portion enriched in hydrogen and methane;
    (c) flash evaporating said condensed portion to at least partially remove additional amounts of hydrogen and methane from said condensed portion as a gaseous flash stream, thereby creating a more-enriched olefin and $C_{2+}$ hydrocarbon product stream;
    (d) membrane treating said uncondensed portion in a membrane separation unit, to further divide said uncondensed portion into a more-enriched hydrogen and methane stream and a mixed stream;

(e) recirculating said gaseous flash stream to said compressing step;

(f) recirculating said mixed stream to said compressing step.

2. The process of claim 1, wherein said compressing step (a) is carried out at a pressure no greater than about 500 psig.

3. The process of claim 1, wherein said cooling step (b) is carried out at a temperature no lower than about −40° C.

4. The process of claim 1, wherein said flash evaporating step (c) is carried out by reducing the pressure of said condensed portion.

5. The process of claim 1, wherein said membrane treating step (d) is carried out using a membrane selective for said olefin and said $C_{2+}$ hydrocarbon over hydrogen and methane.

6. The process of claim 1, wherein said membrane treating step (d) is carried out using a membrane selective for hydrogen and methane over said olefin and said $C_{2+}$ hydrocarbon.

7. The process of claim 1, wherein said olefin comprises ethylene.

8. The process of claim 1, wherein said olefin comprises propylene.

9. The process of claim 1, wherein said more-enriched hydrogen and methane stream contains no more than about 2% of the olefin content of said gas stream.

10. The process of claim 1, wherein said more-enriched olefin and $C_{2+}$ hydrocarbon product stream contains no more than about 10 mol % methane.

11. The process of claim 1, wherein said more-enriched olefin and $C_{2+}$ hydrocarbon product stream contains no more than about 5 mol % methane.

12. The process of claim 1, wherein said more-enriched olefin and $C_{2+}$ hydrocarbon product stream contains no more than about 3 mol % methane.

13. The process of claim 1, wherein said flash evaporating step is carried out in a distillation column having no more than about ten theoretical stages.

14. The process of claim 1, wherein said flash evaporating step is carried out in a distillation column having no more than about three theoretical stages.

15. The process of claim 1, wherein said cooling is achieved at least in part by heat exchange against said more-enriched hydrogen and methane stream.

16. The process of claim 1, wherein said cooling is achieved at least in part by heat exchange against said mixed stream.

* * * * *